(12) United States Patent
Amano

(10) Patent No.: US 6,857,052 B2
(45) Date of Patent: Feb. 15, 2005

(54) MULTI-PROCESSOR SYSTEM INCLUDING A MODE SWITCHING CONTROLLER

(75) Inventor: Hideharu Amano, Kanagawa (JP)

(73) Assignee: Semiconductor Technology Academic Research Center, Kanagawa (JP)

( * ) Notice: Subject to any disclaimer, the term of this patent is extended or adjusted under 35 U.S.C. 154(b) by 263 days.

(21) Appl. No.: 10/078,533

(22) Filed: Feb. 21, 2002

(65) Prior Publication Data

US 2002/0120816 A1 Aug. 29, 2002

(30) Foreign Application Priority Data

Feb. 21, 2001 (JP) ........................................ 2001-045054

(51) Int. Cl.$^7$ .............................................. G06F 12/00
(52) U.S. Cl. ........................ 711/154; 711/118; 711/121; 711/126; 711/131; 711/149; 711/170; 709/244; 709/248; 709/312; 709/400; 713/400; 713/401
(58) Field of Search .......................... 710/107; 711/151, 711/113, 118–126, 131, 149, 154, 170; 709/244, 248, 312, 400; 713/400–401; 712/14

(56) References Cited

U.S. PATENT DOCUMENTS

| | | | | |
|---|---|---|---|---|
| 5,220,660 A | * | 6/1993 | Yoshizawa et al. ......... | 709/400 |
| 5,384,906 A | * | 1/1995 | Horst .......................... | 709/400 |
| 5,388,242 A | * | 2/1995 | Jewett .......................... | 711/113 |
| 5,860,159 A | * | 1/1999 | Hagersten .................... | 711/151 |
| 5,968,160 A | * | 10/1999 | Saito et al. .................... | 712/14 |
| 6,466,988 B1 | * | 10/2002 | Sukegawa et al. .......... | 709/248 |
| 2002/0083243 A1 | * | 6/2002 | Van Huben et al. ........ | 710/107 |

* cited by examiner

*Primary Examiner*—Nasser Moazzami
*Assistant Examiner*—Hashem Farrokh
(74) *Attorney, Agent, or Firm*—McDermott Will & Emery LLP

(57) ABSTRACT

Any of the processors CPU1 to CPUn turns the miss hit detecting signal line 5 to a low level upon detecting occurrence of a miss hit. In response, the mode switching controller 2 is notified of the occurrence of a miss hit and switches each of the processors CPU1 to CPUn to the synchronous operation mode. Also, each command from each of the processors CPU1 to CPUn is appended with a tag. When each of the processors CPU1 to CPUn feeds the synchronization detecting signal line 6 with the tags which are identical as designated as a synchronous point, the operation of the processors can be switched to the non-synchronous operation mode by the mode switching controller 2.

12 Claims, 4 Drawing Sheets

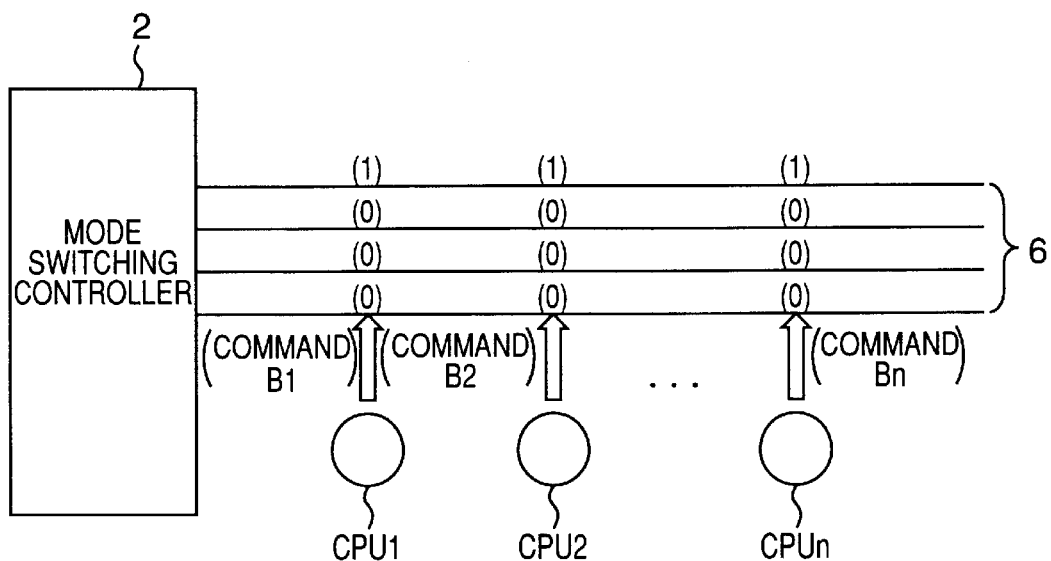

MULTI-PROCESSOR SYSTEM INCLUDING A MODE SWITCHING CONTROLLER

BACKGROUND OF THE INVENTION

1. Field of the Invention

The present invention generally relates to a multi-processor system, and particularly to a multi-processor system using a plurality of processors which are connected via a data bus for executing non-synchronous (or asynchronous) operations.

2. Description of the Prior Art

FIG. 7 is a schematic block diagram showing an arrangement of a conventional multi-processor system for executing a non-synchronous operation.

As shown in FIG. 7, the multi-processor system 100 includes a plurality of processors CPU1 to CPUn each of which executes a non-synchronous operation. The processors CPU1 to CPUn have local memory modules (or memory modules) LOCAL1 to LOCALn respectively dedicated thereto (here, "n" being a natural number as n>1). These processors CPU1 to CPUn are connected via communication memory modules (or memory modules) COMM1 to COMMn respectively to a common data bus 101 including such as a data switching unit. In this conventional example, a data communication bus is used as the data bus 101.

For carrying out a non-synchronous operation, necessary data and commands are previously stored in the local memory modules LOCAL1 to LOCALn, which are scheduled by a compiler with consideration of a delay caused in operating a data switching unit. Thus, when any of the processors accesses a communication memory, the data stored in the communication memory must be always made valid for permitting the non-synchronous execution.

However, the conventional system can perform the non-synchronous operation only when each of the local memory modules LCOAL1 to LOCALn for high-speed operation contains all the necessary data and commands for accessing. This requires each of the local memory modules LOCAL1 to LOCALn to have considerably a large storage capacity. Also, in the case where cache memory modules are used for generally increasing the operation speed thereof, there may occur an uncertainty in operation time of the processors when a miss hit of a cache is detected. As a result, the multi-processor system can hardly execute the non-synchronous operation.

It is noted here that, in this description, the terminology "hit" or "miss hit" of a cache is used to mean that there exists data or no data to be accessed in a cache memory, respectively.

SUMMARY OF THE INVENTION

The present invention has been developed for eliminating the foregoing problems and its object is to provide a multi-processor system which can execute a non-synchronous operation with a general memory arrangement having local memory modules each provided with a dedicated cache memory. More specifically, the memory arrangement is SO configured that, a non-synchronous operation is executed in a hit condition of a cache (which is also referred to as "cache hit mode") and a synchronous operation is executed when a miss hit of a cache occurs (which is also referred to as "cache miss-hit mode").

In this arrangement, barrier synchronization is implemented by appending a tag for synchronization to each command and a non-synchronous operation is executed when the barrier is established. Thus, using a common memory arrangement having each local memory connected with its dedicated cache memory, the non-synchronous operation as well as synchronous operation can be selectively conducted.

According to a first aspect of the present invention, a multi-processor system includes a plurality of processors connected to each other via a data bus comprising a data exchange unit. The system includes: communication memory modules respectively connected between the processors and the data bus; local memory modules respectively dedicated to the processors; cache memories connected respectively between the processors and the dedicated local memory modules; and a mode switching controller for controllably switching an operation mode of the processors. In this arrangement, each of the processors is provided with both a non-synchronous operation mode for executing a non-synchronous operation and a synchronous operation mode for executing a synchronous operation, and when a miss hit of a cache memory is detected in the non-synchronous operation mode by at least one of the processors, the operation mode of all the processors is entirely switched from the non-synchronous operation mode to the synchronous operation mode.

More particularly, it may be modified that, when any one of the processors detects a miss hit of a cache memory in the non-synchronous operation mode, the processor which now detects the miss hit transmits a specific signal to the mode switching controller, and upon receipt of the specific signal, the mode switching controller switches the operation mode of the entire processors from the non-synchronous operation mode to the synchronous operation mode.

Alternatively, it may be modified that each of the processors supplies a tag of at least one bit appended to each command for execution to the mode switching controller, and when the mode switching controller identifies a matching of the tags received from the respective processors in the synchronous operation mode, the mode switching controller switches the operation mode of the entire processors from the synchronous operation mode to the non-synchronous operation mode.

It may further be modified that the tag is appended to each of the commands to be effectively executed by the processors where the commands are scheduled by a compiler to be executed in the same time period.

It may still further be arranged that the tag is transferred from each of the processors to the mode switching controller via a common synchronization detecting signal line made of one or more signal lines the number of which corresponds to the number of bits in the tag, and that the processors are inhibited from executing another command until the mode switching controller receives data having tags identical to the tag previously received from the processors via the synchronization detecting signal line.

Moreover, according to a second aspect of the present invention, it may be modified that a flag is assigned to each predetermined unit data stored in each of the communication memory modules, and when the unit data is written into a communication memory, the flag assigned to the unit data is set to establish a data valid state, and when the written unit data is read out of the communication memory, the flag assigned thereto is reset to be a data invalid state, and in the synchronous operation mode, each of the processors is allowed to read data from a desired communication memory only when the flag of the data indicates the data valid state, and each of the processors is allowed to write data to a desired communication memory only when the flag of the data indicates the data invalid state.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 3 an explanation view showing an example of tag data for synchronization;

FIG. 4 is a schematic view showing an example of a synchronization detecting signal line used in the multi-processor system shown in FIG. 1;

DESCRIPTION OF THE PREFERRED EMBODIMENTS

Figure 1:
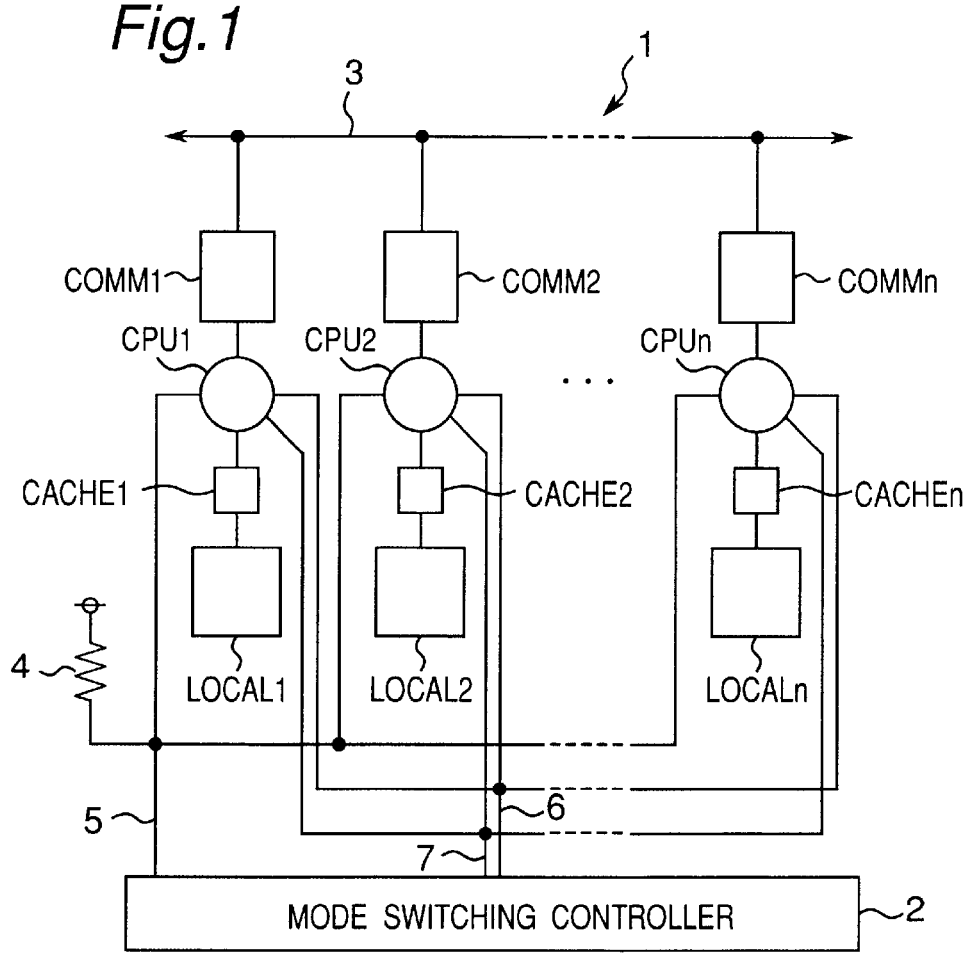
FIG. 1 is a schematic block diagram showing an example of a multi-processor system according to a first embodiment of the present invention.

Before the detailed description proceeds, it is noted that like parts are designated by like reference numerals throughout the accompanying drawings. Preferred embodiments of a multi-processor system according to the present invention will be described below with reference to FIGS. 1 to 6.

[Embodiment 1]

FIG. 1 is a schematic block diagram showing an exemplary arrangement of a multi-processor system according to a first embodiment of the present invention.

As shown in FIG. 1, the multi-processor system 1 includes a plurality of processors CPU1 to CPUn (here "n" being a natural number as n>1), local memory modules LOCAL1 to LOCALn which are connected to the processors CPU1 to CPUn, respectively via cache memories CACHE1 to CACHEn, and a lock/unlock type communication memory modules COMM1 to COMMn respectively dedicated to the processors. Thus, the processors CPU1 to CPUn have their corresponding local memory modules LOCAL1 to LOCALn, cache memories CACHE1 to CACHEn, and communication memory modules COMM1 to COMMn, serially connected thereto, respectively.

The processors CPU1 to CPUn are connected to a data communication bus 3 via the communication memory modules COMM1 to COMMn, respectively, and the processors CPU1 to CPUn are connected to one another via the data communication bus 3. The multi-processor system 1 further includes a mode switching controller 2 for controllably switching an operation mode of each of the processors CPU1 to CPUn between a non-synchronous operation mode and a synchronous operation mode.

The mode switching controller 2, which is pulled up by a pull-up resistor 4, is connected to the processors CPU1 to CPUn via signal lines 5, 6 and 7. The signal line 5 is a cache miss detecting signal line provided for detecting an occurrence of a miss hit of a cache on any of the processors CPU1 to CPUn during the non-synchronous operation mode. The signal line 5 may be serving as a switching barrier synchronization line.

The signal line 6 is a synchronization detecting signal line provided for detecting the synchronization of all the processors CPU1 to CPUn during the synchronous operation mode. The signal line 7 is a control signal line provided for controlling a switching operation between the non-synchronous and synchronous operation modes for each of the processors CPU1 to CPUn.

In this arrangement, each of the processors CPU1 to CPUn holds the cache miss detecting signal line 5 at a high level when no miss hit of a cache is detected in a normal condition. When a miss hit of a cache is detected by any of the processors CPU1 to CPUn, the cache miss detecting signal line 5 is turned to a low level. In other words, the cache miss detecting signal line 5 remains at the high level when no miss hit of a cache is detected by any of the processors CPU1 to CPUn, and the cache miss detecting signal line 5 is turned to the low level upon detecting occurrence of a miss hit by any of the processors CPU1 to CPUn.

More specifically, when the cache miss detecting signal line 5 is held at the high level, the operation mode switching controller 2 feeds the processors CPU1 to CPUn with a control signal via the control signal line 7 for executing the non-synchronous operation in the non-synchronous operation mode.

On the other hand, when the cache miss detecting signal line 5 is turned to the low level, the operation mode switching controller 2 feeds a control signal for executing the synchronous operation in the synchronous operation mode. When receiving the control signal for operating in the synchronous operation mode, each of the processors CPU1 to CPUn extracts a system clock signal and starts the synchronous operation using the system clock.

Figure 2:
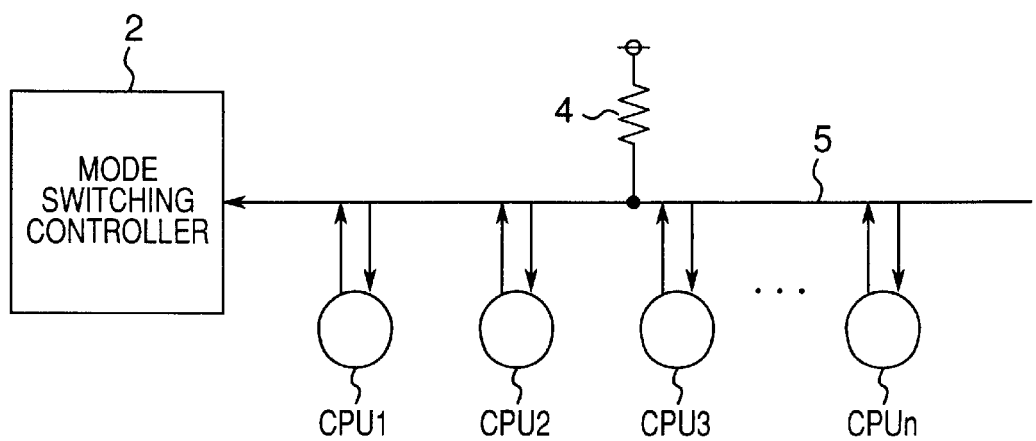
FIG. 2 is a schematic view showing an example of a cache miss detecting signal line used in the multiprocessor system shown in FIG. 1.

FIG. 2 shows a schematic view for explaining a mode switching operation of the mode switching controller 2. As shown in FIG. 2, during an operation in the non-synchronous operation mode for each of the processors CPU1 to CPUn, when a miss hit of a cache is detected by any of the processors, for example, by CPU1, the cache miss detecting signal line 5 is turned to the low level by the processor CPU 1. Then, the mode switching controller 2 controls all of the processors CPU1 to CPUn to switch the operation mode from the non-synchronous mode to the synchronous operation mode.

In this switching operation, even if a timing of the mode switching is delayed or shifted more or less between the processors, no problem arises by setting a transmission speed over the cache miss detecting signal line 5 to be much higher than the operating speed of the communication memory modules.

Referring to FIG. 3, each of commands A-D to be executed by the processors CPU1 to CPUn is appended with tag data of some bits, e.g. four bits in this example. The tag data of such as four bits is transferred from the processors to the mode switching controller 2 via the synchronization detecting signal line 6. When the commands are scheduled by a compiler to be executed at the same time period, the synchronous bits of the tags are set to "1" for identification, which is called a synchronous point. In FIG. 3, the commands B and D indicate the synchronous points.

In the non-synchronous operation mode, the tag data is simply read out together with the command. Whereas, in the synchronous operation mode, the tag data is outputted from the processors CPU1 to CPUn and transmitted to the mode switching controller 2 via the synchronization detecting signal line 6. The processors CPU1 to CPUn are so controlled as to withhold subsequent commands until the mode switching controller 2 receives the tags which are identical to those precedently outputted from the processors via the synchronization detecting signal line 6.

In the synchronous operation mode, when the identical tag data is outputted from the processors CPU1 to CPUn and transmitted to the mode switching controller 2 via the synchronization detecting signal line 6 as shown in FIG. 4, the mode switching controller 2 delivers a control signal for directing each of the processors CPU1 to CPUn to switch the operation mode from the synchronous operation mode to the non-synchronous operation mode. Upon receipt of the control signal, each of the processors CPU1 to CPUn starts the non-synchronous operation.

In this example, although the tag data carries four bits as shown in FIG. 3, it is not limited to this and the number of the bits of a tag may be any of one or more. In this arrangement, the synchronization detecting signal line 6 is comprised of the number of signal lines corresponding to the number of the bits in the tag. Also, the cache miss detecting signal line 5 and the synchronization detecting signal line 6 may be made of barrier synchronous lines. Thus, the multi-processor system can be implemented without enlarging its hardware arrangement.

Thus, in the multi-processor system of Embodiment 1, when a miss hit of a cache is detected by any of the processors, the cache miss detecting signal line 5 is turned to the low level by the processor which detected the miss hit of a cache. Then, the mode switching controller 2 detects occurrence of the miss hit of a cache, and controls each of the processors CPU1 to CPUn to switch the operation mode to start the synchronous operation mode.

Also, each command to be executed by any of the processors CPU1 to CPUn is added with a tag of one or more bits, and when the tags having the same bits set as the synchronous point are outputted onto the synchronization detecting signal line 6 from each of the processors CPU1 to CPUn, the mode switching controller 2 switches the operation mode of each of the processors CPU1 to CPUn to the non-synchronous operation mode from the synchronous operation mode. Accordingly, the non-synchronous operation can be executed in the multi-processor system having a common memory arrangement of local memory modules each of which is equipped with a dedicated cache memory.

Thus, a tag is appended to each of the commands to be effectively executed by the processors where the commands are scheduled by a compiler for executing the tasks in the same time period on all the processors. When the identical tags are received from the respective processors in the synchronous operation mode, the operation mode of the processors is switched to the non-synchronous mode. This can eliminate any unwanted pipeline bubble which is generated by a synchronization command even when the command is not executed.

The operation of each of the processors for executing another command is inhibited until the mode switching controller 2 receives data appended with a tag identical to the tag of the data previously released onto the synchronization detecting signal line. Accordingly, the processors are synchronized with each other in the synchronous operation mode, and each of the processors can equally operate the non-synchronous operation after switched to the non-synchronous operation mode.

[Embodiment 2]

In Embodiment 1 described above, when a series of miss hits of caches occur in plural processors consecutively, the multi-processor system may be declined in performance because all of the processors CPU1 to CPUn have to be frequently switched to the synchronous operation mode every time the miss hits are detected.

Embodiment 2 of the present invention is hence a modification of the multi-processor system of Embodiment 1 where a synchronous flag is provided for each word in the data stored in the communication memory modules COMM1 to COMMn, and reading and writing operations of the data are executed according to the synchronous flag.

Figure 5:
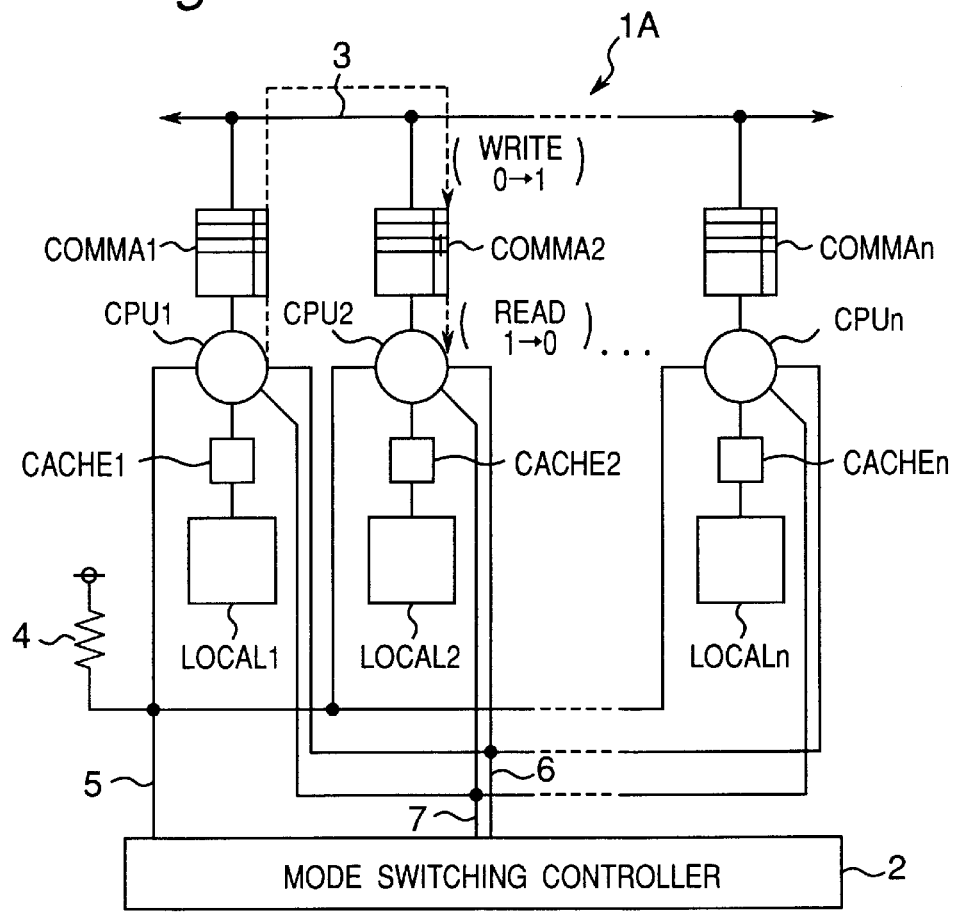
FIG. 5 is a schematic block diagram showing an example of a multi-processor system according to a second embodiment of the present invention.

FIG. 5 is a schematic block diagram showing an exemplary arrangement of the multi-processor system according to Embodiment 2 of the present invention. In FIG. 5, like components are denoted by like numerals as those shown in FIG. 1 and will be explained in no more detail and the difference from FIG. 1 is only described.

FIG. 5 is differentiated from FIG. 1 in the fact that each word serving as a unit data of the data stored in the communication memory modules COMM1 to COMMn is appended with a synchronous flag. Specifically, the communication memory modules COMM1 to COMMn shown in FIG. 1 are replaced by communication memory modules COMMA1 to COMMAn shown in FIG. 5 while the multi-processor system is denoted by 1A in FIG. 5 instead of 1 shown in FIG. 1.

Figure 6:
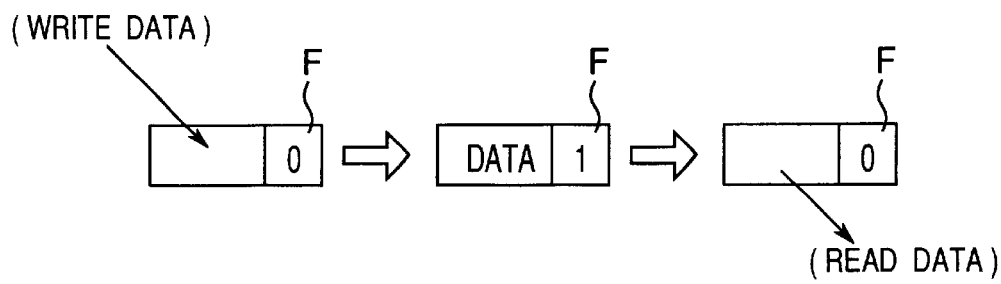
FIG. 6 is an explanation view showing an example of different states of a synchronous flag.
Figure 7:
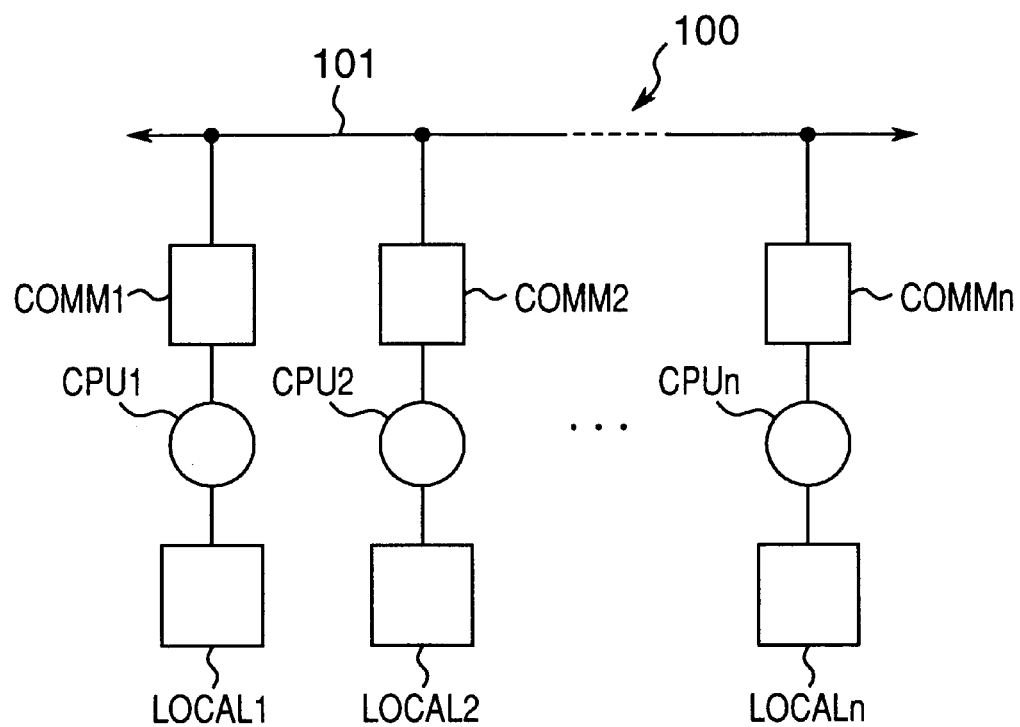
FIG. 7 is a schematic block diagram showing an example of a conventional multi-processor system.

FIG. 6 illustrates an example of different states of a synchronous flag F in this Embodiment 2. As shown in FIGS. 5 and 6, when data is written in one (e.g., COMMA2 in FIG. 5) of the communication memory modules COMMA1 to COMMAn, each word in the data is set with a synchronous flag F (0⇒1) to establish the data valid state. When the data written in COMMA2 is read out by the corresponding CPU2, the synchronous flag F set for the word of the read-out data is reset (1⇒0) to the data invalid state. In the non-synchronous operation mode, the synchronous flag F is ignored by each of the processors CPU1 to CPUn. On the other hand, in the synchronous operation mode, the following process is initiated with reference to the synchronous flag F. The synchronous flag F may be a synchronization bit.

When a data writing operation is executed by each of the processor CPU1 to CPUn to each of the communication memory modules COMMA1 to COMMAn, the data stored in a subject communication memory is made valid by setting each word with a synchronous flag F (=1), and then each of the processors CPU1 to CPUn remains at its standby state where the writing of the data into its corresponding communication memory is inhibited. On the other hand, when the data is in the invalid state having each word reset with a synchronous flag F (=0), the writing of the data is allowed. When the data has been written into the communication memory, each word of the data is set with a synchronous flag F (=1) so that the data state is turned to be valid.

When a data reading operation is executed by each of the processor CPU1 to CPUn by accessing any of the communication memory modules COMMA1 to COMMAn, the data is made invalid by resetting each word with a synchronous flag F (=0), where each of the processors CPU1 to CPUn remains at its standby state and the reading of the data from its corresponding communication memory is inhibited.

On the other hand, when the data is made valid having each word set with a synchronous flag F (=1), the reading of the data is allowed. When the data has been read out of the communication memory, each word of the data is reset with a synchronous flag F (=0) so that the data is turned to be invalid.

As described above, when the processors CPU1 to CPUn are turned to the synchronous operation mode, the processors are normally responsive to the synchronous flag F to execute parallel programs. When a group of programs, e.g. in one loop operation, have been executed, the operation mode is switched back to the non-synchronous operation mode in the same manner as described in Embodiment 1. That is, the mode switching operation executed by the mode switching controller 2 is same as shown in FIG. 2 explained in Embodiment 1. Also, in this embodiment, the cache miss detecting signal line 5 and the synchronization detecting signal line 6 may be made of barrier synchronous lines.

As described above, in the multi-processor system of Embodiment 2, unlike that of Embodiment 1, each word of the data stored in the communication memory modules COMMA1 to COMMAn is appended with a synchronous flag so that the reading and writing of the data is controlled with reference to the synchronous flag. Accordingly, the advantage obtained in Embodiment 1 is equally ensured in Embodiment 2, while eliminating the drawback involved in Embodiment 1. Namely, even when a series of miss hits of caches occur in plural processors consecutively, the multi-processor system can be maintained in performance because all of the processors CPU1 to CPUn are not required to be frequently switched to the synchronous operation mode every time the miss hits are detected.

Moreover, the arrangement of Embodiment 2 can eliminate any unwanted pipeline bubble which may be undesirably generated by a synchronization command even when the command is not executed.

As set forth above, according to the first aspect of the present invention, the multi-processor system is so arranged for allowing each of the processors that, for example, when a miss hit of a cache occurs in the non-synchronous operation mode, a predetermined signal indicating the occurrence of a miss hit is generated by the corresponding processor to be detected, and upon detecting the occurrence of a miss hit of a cache at least on any of the processors, the operation mode of each of the processors is systematically switched from the non-synchronous mode to the synchronous mode.

Accordingly, when the processor has a miss hit of a cache error in the non-synchronous operation mode, the operation of all the processors is switched to the synchronous mode. Hence, the multi-processor system with a common memory arrangement is permitted to execute the non-synchronous operation.

In this aspect, a tag is appended to each of the commands to be effectively executed by the processors where the commands are scheduled by a compiler for executing the tasks in the same time period on all the processors. When the identical tags are received from the respective processors in the synchronous operation mode, the operation mode of the processors is switched from the synchronous mode to the non-synchronous mode. This can eliminate any unwanted pipeline bubble which is generated by a synchronization command even when the command is not executed.

The operation of each of the processors for executing another command is inhibited until data having a tag identical to the tag of the data released onto the synchronization detecting signal line is received from the synchronization detecting signal line. Accordingly, the processors are synchronized in the synchronous operation mode, and each of the processors can equally operate the non-synchronous operation after switched from the synchronous operation mode to the non-synchronous operation mode.

Furthermore, according to the second aspect of the present invention, the communication memory has each unit data which is appended with a flag so that each processor is allowed to perform the reading and writing of data on a desired communication memory in accordance with the flag state. Accordingly, any unwanted loss of time caused by frequently switching of the operation mode can duly be eliminated even in the case where a series of miss hits of caches occur in a plurality of processors.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A multi-processor system having a plurality of processors connected to each other via a data bus, said system comprising:

communication memory modules respectively connected between the processors and the data bus;

local memory modules respectively dedicated to said processors;

cache memories connected respectively between the processors and the dedicated local memory modules; and a mode switching controller for controlling a switching of an operation mode of said processors, wherein each of the processors has a non-synchronous operation mode for executing a workload in parallel with respect to the other processors and a synchronous operation mode for executing a synchronous operation, and when a miss hit of a cache memory is detected in the non-synchronous operation mode by at least one of the processors, the operation mode of all the processors is entirely switched from the non-synchronous operation mode to the synchronous operation mode.

2. The multi-processor system according to claim 1, wherein when any one of the processors detects a miss hit of a cache memory in the non-synchronous operation mode, the processor detecting the miss hit transmits a specific signal to the mode switching controller, and upon receipt of the specific signal, the mode switching controller switches the operation mode of the entire processors from the non-synchronous operation mode to the synchronous operation mode.

3. The multi-processor system according to claim 1, wherein each of the processors supplies a tag of at least one bit appended to each command for execution to the mode switching controller, and when the mode switching controller identifies a matching of the tags received from the respective processors in the synchronous operation mode, the mode switching controller switches the operation mode of the entire processors from the synchronous operation mode to the non-synchronous operation mode.

4. The multi-processor system according to claim 3, wherein the tag is appended to each of the commands to be effectively executed by the processors where the commands are scheduled by a compiler to be executed in the same time period.

5. The multi-processor system according to claim 3, wherein the tag is transferred from each of the processors to the mode switching controller via a common synchronization detecting signal line made of one or more signal lines the number of which corresponds to the number of bits in the tag and wherein the processors are inhibited from executing another command until the mode switching controller receives data having tags identical to the tag previously received from the processors via the synchronization detecting signal line.

6. The multi-processor system according to claim 4, wherein the tag is transferred from each of the processors to the mode switching controller via a common synchronization detecting signal line made of one or more signal lines the number of which corresponds to the number of bits in the tag and wherein the processors are inhibited from executing another command until the mode switching controller receives data having tags identical to the tag previously received from the processors via the synchronization detecting signal line.

7. The multi-processor system according to claim 1, wherein a flag is assigned to each predetermined unit data stored in each of the communication memory modules, and when the unit data is written into a communication memory, the flag assigned to the unit data is set to establish a data valid state, and when the written unit data is read out of the communication memory, the flag assigned thereto is reset to be a data invalid state, and wherein in the synchronous operation mode, each of the processors is allowed to read data from a desired communication memory only when the flag of the data indicates the data valid state, and each of the processors is allowed to write data to a desired communication memory only when the flag of the data indicates the data invalid state.

8. The multi-processor system according to claim 2, wherein a flag is assigned to each predetermined unit data stored in each of the communication memory modules, and when the unit data is written into a communication memory, the flag assigned to the unit data is set to establish a data valid state, and when the written unit data is read out of the communication memory, the flag assigned thereto is reset to be a data invalid state, and wherein in the synchronous operation mode, each of the processors is allowed to read data from a desired communication memory only when the flag of the data indicates the data valid state, and each of the processors is allowed to write data to a desired communication memory only when the flag of the data indicates the data invalid state.

9. The multi-processor system according to claim 3, wherein a flag is assigned to each predetermined unit data stored in each of the communication memory modules, and when the unit data is written into a communication memory, the flag assigned to the unit data is set to establish a data valid state, and when the written unit data is read out of the communication memory, the flag assigned thereto is reset to be a data invalid state, and wherein in the synchronous operation mode, each of the processors is allowed to read data from a desired communication memory only when the flag of the data indicates the data valid state, and each of the processors is allowed to write data to a desired communication memory only when the flag of the data indicates the data invalid state.

10. The multi-processor system according to claim 4, wherein a flag is assigned to each predetermined unit data stored in each of the communication memory modules, and when the unit data is written into a communication memory, the flag assigned to the unit data is set to establish a data valid state, and when the written unit data is read out of the communication memory, the flag assigned thereto is reset to be a data invalid state, and wherein in the synchronous operation mode, each of the processors is allowed to read data from a desired communication memory only when the flag of the data indicates the data valid state, and each of the processors is allowed to write data to a desired communication memory only when the flag of the data indicates the data invalid state.

11. The multi-processor system according to claim 5, wherein a flag is assigned to each predetermined unit data stored in each of the communication memory modules, and when the unit data is written into a communication memory, the flag assigned to the unit data is set to establish a data valid state, and when the written unit data is read out of the communication memory, the flag assigned thereto is reset to be a data invalid state, and wherein in the synchronous operation mode, each of the processors is allowed to read data from a desired communication memory only when the flag of the data indicates the data valid state, and each of the processors is allowed to write data to a desired communication memory only when the flag of the data indicates the data invalid state.

12. The multi-processor system according to claim 6, wherein a flag is assigned to each predetermined unit data stored in each of the communication memory modules, and when the unit data is written into a communication memory, the flag assigned to the unit data is set to establish a data valid state, and when the written unit data is read out of the communication memory, the flag assigned thereto is reset to be a data invalid state, and wherein in the synchronous operation mode, each of the processors is allowed to read data from a desired communication memory only when the flag of the data indicates the data valid state, and each of the processors is allowed to write data to a desired communication memory only when the flag of the data indicates the data invalid state.

* * * * *